Oct. 13, 1964  J. S. WRIGHT  3,152,873
GRAIN DRYING

Filed April 15, 1960  6 Sheets-Sheet 1

INVENTOR.
JOHN S. WRIGHT
BY
Barnes, Kisselle, Raisch & Choate
ATTORNEYS

Oct. 13, 1964  J. S. WRIGHT  3,152,873
GRAIN DRYING
Filed April 15, 1960  6 Sheets-Sheet 2
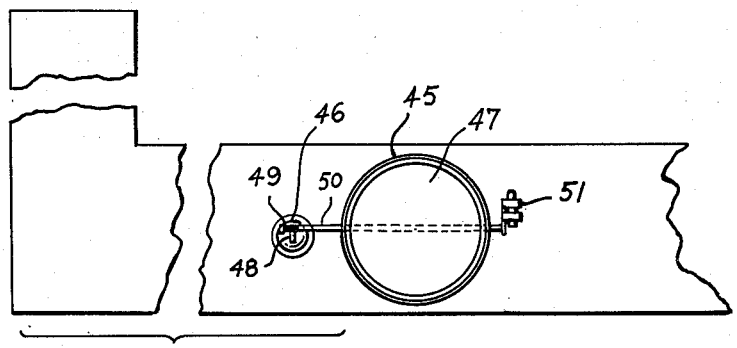
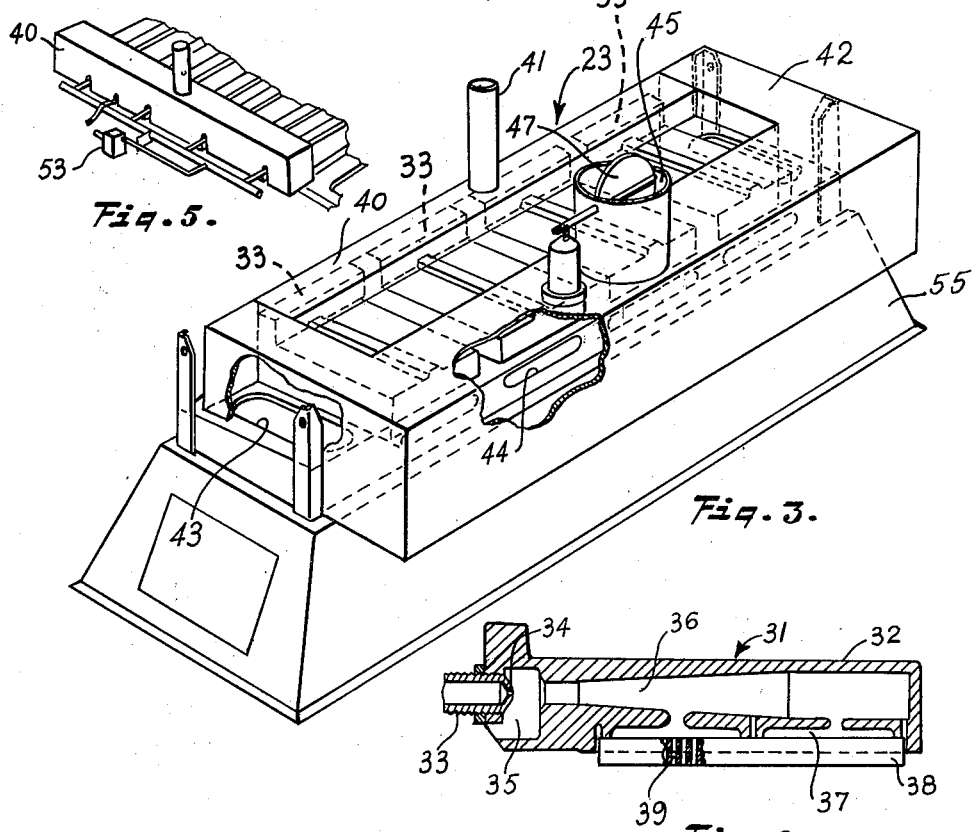
INVENTOR.
JOHN S. WRIGHT
BY
Barnes, Kisselle, Raisch & Choate
ATTORNEYS Oct. 13, 1964  J. S. WRIGHT  3,152,873
GRAIN DRYING
Filed April 15, 1960  6 Sheets-Sheet 3

INVENTOR.
JOHN S. WRIGHT
BY
Barnes, Kisselle, Raisch
& Choate ATTORNEYS

INVENTOR.
John S. Wright
BY
Barnes, Kisselle, Raisch & Choate
ATTORNEYS

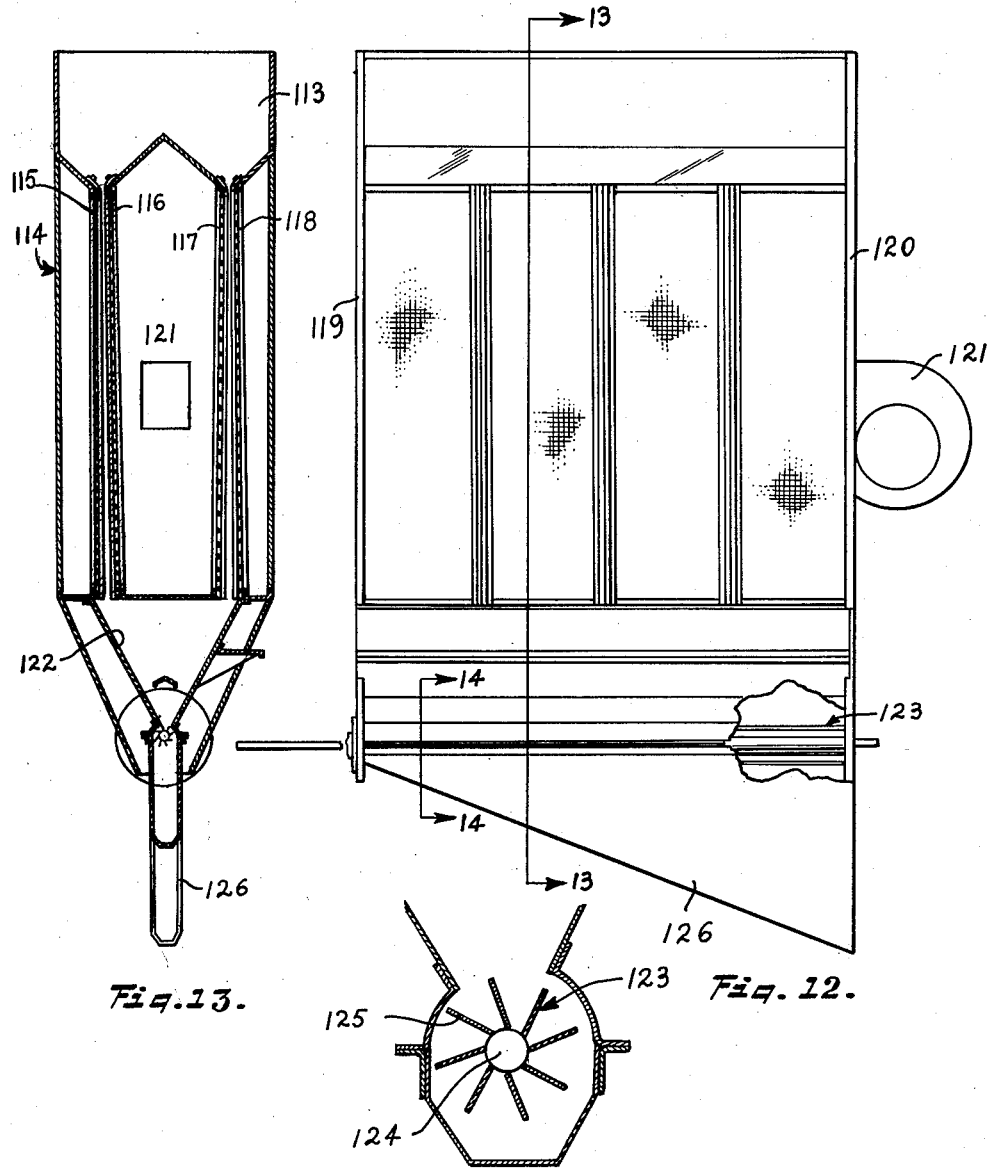

United States Patent Office 3,152,873
Patented Oct. 13, 1964

3,152,873
GRAIN DRYING
John S. Wright, Carleton, Mich., assignor, by mesne assignments, to General Precision Inc., Tarrytown, N.Y., a corporation of Delaware
Filed Apr. 15, 1960, Ser. No. 22,596
3 Claims. (Cl. 34—52)

This invention relates to the drying of grain and particularly to a method and apparatus for drying grain to a predetermined controllable moisture content.

The moisture content is an important characteristic of grain. In certain uses of grain, such as corn, it is essential that the moisture content be at a predetermined low level. Accordingly, it has been customary for the price of grain to be related to the moisture content of the grain. Thus, when a farmer sells his grain to a grain elevator, he is paid a premium if the grain is of a predetermined low moisture content and is paid a lesser amount and thereby is penalized, if the grain has a high moisture content. There has therefore been a great need for an inexpensive method and apparatus for reducing the moisture content of grain to a predetermined low level.

Attempts to provide a low cost dryer have proved unsuccessful because of the high cost necessary in producing such apparatus and, in addition, the slow inefficient operation of such dryers. A majority of such dryers utilize heated air which is passed over or through a batch of grain to reduce its moisture. The control of such heated air is very difficult and it is almost impossible to reduce the moisture of grain to a predetermined level. Thus, it has been customary in the use of such dryers to heat the batch of grain one or more times, stop the dryer, and check the moisture content. The dryer is then started again to further heat the grain, if needed, in an effort to reduce the moisture content of the grain to the vicinity of the desired percentage of moisture.

A major disadvantage of prior art grain dryers utilizing heated air has been that such grain dryers tend to scorch or adversely affect the composition of the grain such as the starch content, germination, protein and carbohydrate content. Because such prior art methods heat from the exterior toward the interior, the accurate control of moisture content is very difficult because the grain must reach an equilibrium with the atmosphere after being heated.

Another very important disadvantage of such dryers is the high cost which makes it almost prohibitive for the average farmer to own and operate such a dryer.

Accordingly, farmers have had to be content with obtaining whatever price they could from the grain without making any particular effort to control the moisture content thereof. The problem of humidity control and drying of grain has become even more acute because of the recent advent of other apparatus for handling grain such as picker shellers and the like which make it possible for a farmer to convert his agricultural products into grain form at low cost and at high rates. Without some means of controlling moisture content of the grain, the most efficient use of such apparatus is not achieved.

It is therefore an object of this invention to provide a novel method and apparatus for reducing the moisture content of grain to a predetermined accurate controllable level.

It is a further object of the invention to provide novel apparatus for utilizing infrared gas heat in an enclosed space.

It is a further object of the invention to provide such a method and apparatus wherein the moisture content is reduced to a predetermined level quickly and in a single pass.

It is a further object of the invention to provide a novel method and apparatus for drying grain wherein the germination and the composition of the grain is not adversely affected by the drying.

It is a further object of the invention to provide such a method and apparatus wherein the grain is handled continuously.

It is a further object of the invention to provide such a method and apparatus which includes novel means for controlling the moisture content of the grain.

It is a further object of the invention to provide such a method and apparatus which utilizes infrared gas heat.

It is a further object of the invention to provide such a method and apparatus wherein novel conveyor means are provided.

It is a further object of the invention to provide such a method and apparatus including novel cooling of the grain.

In the drawings:

FIG. 3 is a perspective view, parts being broken away, of an infrared generator assembly used in the gas drying apparatus.

FIG. 4 is a fragmentary top plan view of the assembly shown in FIG. 3.

FIG. 5 is a fragmentary rear perspective view of the apparatus shown in FIG. 3.

FIG. 6 is a longitudinal sectional view through an infrared generator used in the assembly shown in FIGS. 3 to 5.

FIG. 12 is a side elevation of the cooling apparatus shown in FIG. 11, parts being broken away.

FIG. 13 is a sectional view of the cooling apparatus taken along the line 13—13 in FIG. 12.

FIG. 14 is a sectional view taken along the line 14—14 in FIG. 12.

Figure 1:
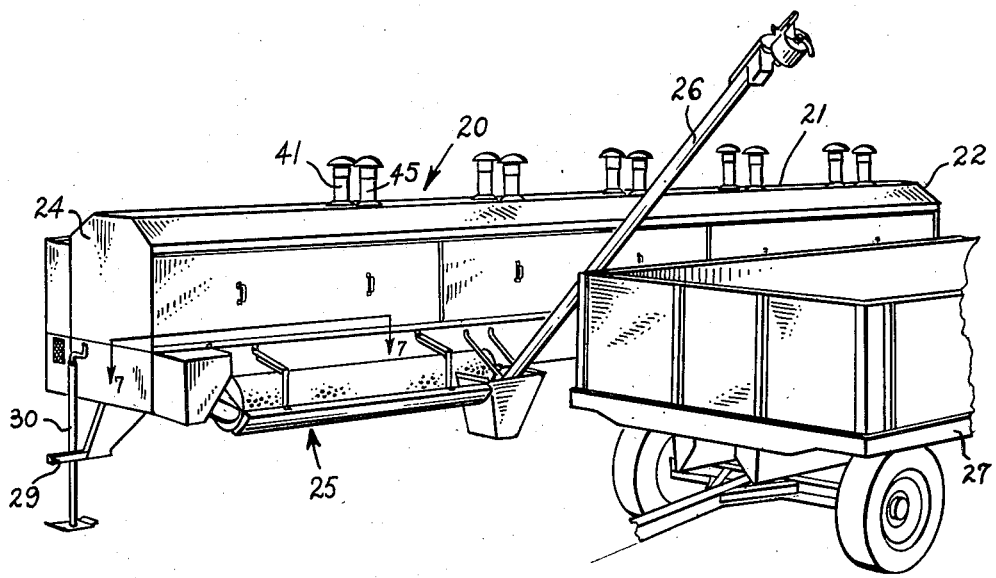
FIG. 1 is a perspective view of the apparatus embodying the invention showing the apparatus in operating position adjacent a truck.
Figure 2:
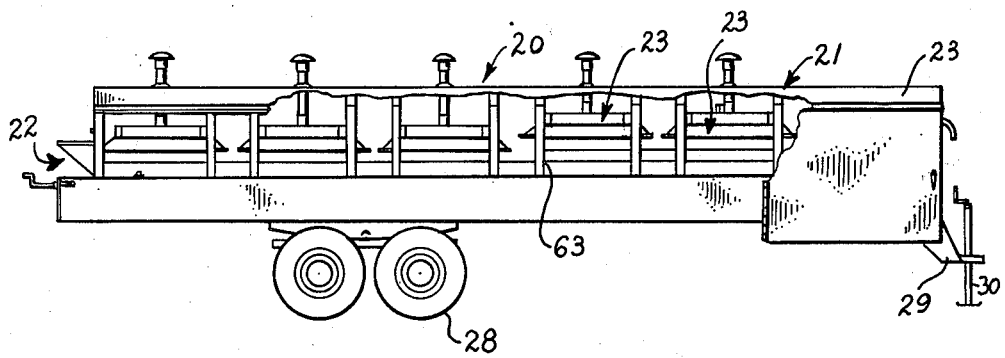
FIG. 2 is a side elevation of the grain drying apparatus opposite that shown in FIG. 1, parts being broken away.

Referring to FIG. 1, grain dryer 20 comprises a housing 21 which defines a tunnel to one end 22 of which grain is continuously fed by hand or by a conveyor, not shown. The grain is carried through the tunnel beneath infrared generator assemblies 23 to the other end 24 thereof and thereafter is carried through a cooler 25 where the temperature of the grain is reduced so that the grain can finally be removed by a portable screw conveyor 26 and loaded into a trailer or truck 27. As shown in FIG. 2, the grain dryer 20 is in the form of a trailer having wheels 28 and a yoke 29 whereby it can be attached to a motor vehicle for movement from one place to the other. A retractable support 30 on yoke 29 holds the end of the grain dryer 20 in spaced relation to the ground when the grain dryer is detached from the motor vehicle.

As the grain passes through the tunnel formed by the housing 21, it is subjected to infrared rays from the infrared generator assemblies 23 which include gas generators that discharge infrared rays.

*Infrared Generator Assemblies*

Referring to FIGS. 3-6, each infrared generator assembly 23 comprises a bank of infrared gas generators 31 which burn a mixture of air and natural or liquid gas, such as the type shown in the patent to Schwank, 2,775,-294, issued December 25, 1956. Such infrared generators comprise a housing 32 having a gas inlet 33 at one end thereof. Gas enters the inlet 33 and is metered through an orifice 34 to a chamber 35 which communicates with air from the exterior. The gas is directed from the orifice 34 through the chamber 35 to the inlet of a venturi 36 thereby aspirating air through the chamber 35 into the venturi 36. The gas and air are mixed in the venturi 36 and the mixture is evenly distributed to the chamber 37. A ceramic mat 38 which is of substantially uniform thickness is provided adjacent chamber 37. Mat 38 has a plurality of fine holes 39 therein so that the gas and air pass through the holes and burn as a separate minute flame at each hole. When the gases burn, the entire surface of the ceramic 38 has its temperature elevated. The flame is substantially invisible. By this combustion process, far infrared rays are generated as contrasted to near infrared rays such as are developed by electrical infrared bulbs. A major portion of the infrared rays generated range from 1.5 to 6.0 microns in wave length with the greatest output being approximately 2.5 microns.

Referring to FIG. 3, each infrared generator assembly 23 includes a rectangular housing 40 extending along one end of each generator 31 and communicating with the air passages 35 of each of the generators 31. An air intake stack 41 extends upwardly from housing 40 through the roof of the housing 21 to the exterior (FIG. 1). In this fashion, air from the exterior is aspirated by the passage of gas to the generators 31. A second housing 42 which is generally U-shaped and rectangular in cross section is provided around the other ends and sides of the bank of generators 31 and includes openings 43 in the bottom wall thereof and openings 44 in the side walls thereof adjacent the plane of generators 31. The openings 43 permit the exhaust of the moisture from the grain upwardly into the interior of the housing 42. Openings 44 permit the exhaust of combustion gases from the generators 31 to the interior of housing 42. A stack 45 extends upwardly from housing 42 through the top of housing 21 to exhaust the moisture and exhaust gases to the exterior of the dryer (FIG. 1). A hood 55 surrounds the bank of generators 31 beneath housings 41 and 42.

As shown in FIG. 4, a bimetallic spring 46 is positioned on the top wall of chamber 42 adjacent the exhaust conduit 45 and is adapted to operate a damper 47 in the conduit 45. The spring 46 vertically moves a rack 48 which engages teeth 49 on the shaft 50 of the damper 47. A mercury switch 51 is mounted on the shaft 50 of damper 47. As the heat in the chamber 42 causes the spring 46 to expand, the shaft 50 is caused to rotate moving the damper 47 to an open position corresponding to the expansion of the spring. When the shaft 50 is rotated to fully open position, the switch 51 is actuated to energize a solenoid 53 (FIG. 5) that controls the valve supplying gas under pressure to the generators 31.

Figure 16:
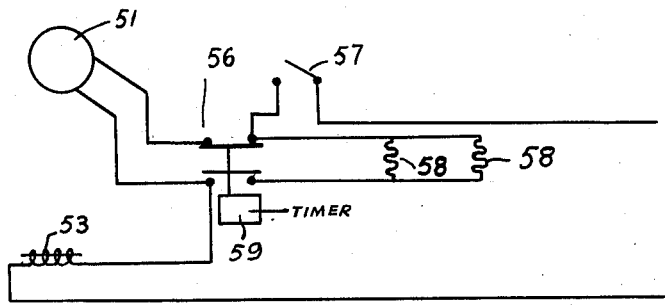
FIG. 16 is a diagrammatic wiring diagram of a control apparatus for the infrared generator apparatus.

Referring to FIG. 16, which is a diagrammatic wiring diagram of the control mechanism for the infrared gas generator assembly, the mercury switch 51 is in series with solenoid 53. The switch 51 is also in parallel with a double acting switch 56 that has one set of contacts thereof normally closed and extending to an on-off switch 57. The other set of contacts of switch 56 is connected to a heater element 58 which also extends to the switch 57. In order to energize the infrared generators, the on-off switch 57 is closed and the double acting switch 56 is depressed actuating a time delay 59 that keeps the switch 56 depressed. In the depressed position, the switch 56 closes the circuit to the heater elements 58, one heater being provided for each generator 31. When the heater elements 58 ignite the gas, the hot gases act on bimetallic spring 46 to move the damper 47 until the mercury switch 51 is closed. Thus, when the time delay stops and the switch 56 returns to its initial position, a circuit is maintained through the mercury switch 51 thereby maintaining the solenoid valve 53 energized. In the event that imperfect combustion occurs at any time and the temperature of the exhaust gases drops, the mercury switch opens to de-energize solenoid 53 and close the gas valve.

Figure 17:
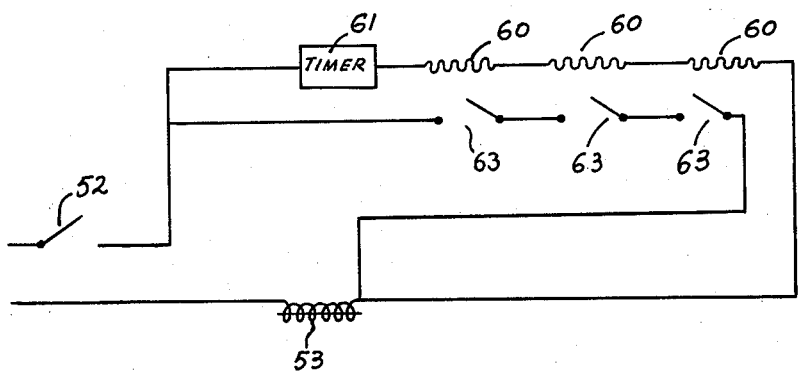
FIG. 17 is a diagrammatic wiring diagram of a modified control apparatus for the infrared generator apparatus.

A modified form of control mechanism for the infrared gas generator assemblies is shown in FIG. 17 wherein gas valve 53 is in series with a plurality of heater elements 60, one for each gas generator 31, and a timer switch 61 and a switch 52. A solenoid valve is in parallel with a plurality of thermostatically operated switches 63. When the switch 52 is closed, the igniter elements 60 are energized and held in energized position for a predetermined interval of time as established by timer 61. If proper ignition of the generators 31 occurs, then the heat closes thermostatic switches 63 maintaining the energization of solenoid 63 after the timer opens the switch thereinto igniter elements 60.

By the use of the housing 40 and conduit 41, the air for generators 31 is aspirated from the exterior of the tunnel formed in the dryer housing 21 thereby preventing dust or other foreign matter from the grain from entering the generators 31 and plugging the holes 39 of the ceramic mats 38. This eliminates improper combustion in the generators due to the presence of foreign particles. The accumulation of carbon monoxide by improper combustion is thereby entirely eliminated.

If the weight of the air should change because of a change in humidity of the incoming air or because of a very dry condition in the tunnel, the amount of air aspirated by the burners will change. However, the thermostatically controlled damper 47 will produce a proper balance between the air and the gas continuing the performance of the burner at high efficiency.

The separate chamber formed by the housing 42 with the external conduits 45 insures that the products of combustion will not collect in the vicinity of the generators 31 and thereby adversely affect the combustion. Infrared gas generators are characterized by forming a film of carbon dioxide between the flame and the article being heated or dried. Any unbalance in combustion will cause a loss in the formation of this film of carbon dioxide so that the generators become a fire hazard. In case of drying grain, the accumulation of uncombusted gases such as carbon monoxide in the tunnel formed by the housing 21 would produce a potential fire or explosion hazard. Accordingly, the use of the generator assemblies permits the infrared gas generators to be used in an enclosed space. At the same time that the exhaust gases are removed through the housing 42 of each assembly, the moisture driven off from the grain is also removed so that no moisture will accumulate in the housing 21.

*Conveying Means*

The grain is moved and tumbled beneath successive generator assemblies 23. As shown in FIG. 2, successive generator assemblies 23 are positioned at decreasing heights above the grain as it is moved through the tunnel formed by the housnig 21, or to the left as shown in FIG. 2. The housing 21 includes a longitudinally extending frame 60 comprising longitudinal members 61 and transverse members 62. Uprights 63 extend upwardly from the frame 60 to support the generator assemblies 23 and the panels that comprise the enclosed tunnel.

Figure 7:
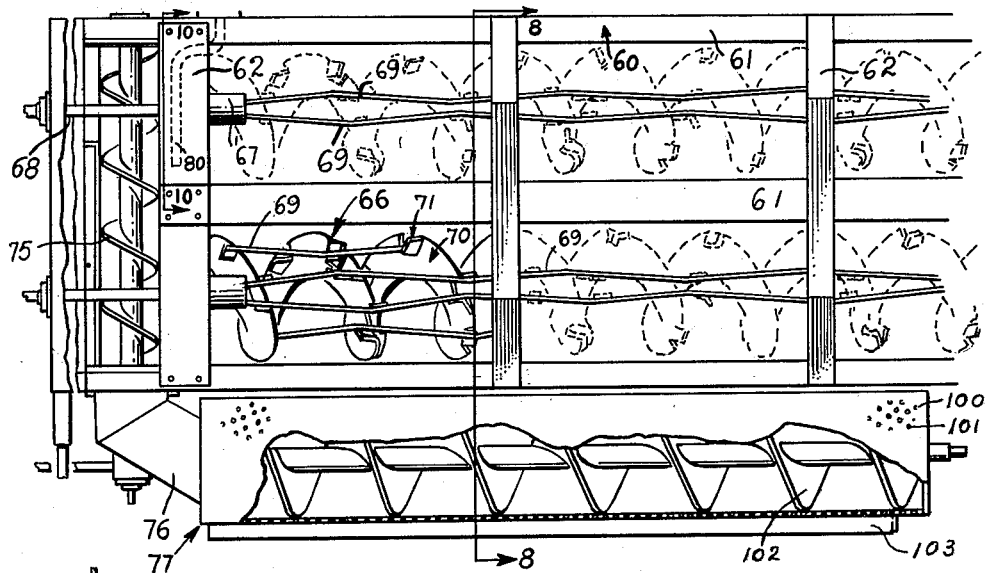
FIG. 7 is a fragmentary part sectional plan view taken generally along line 7—7 in FIG. 1, parts being broken away.
Figure 10:
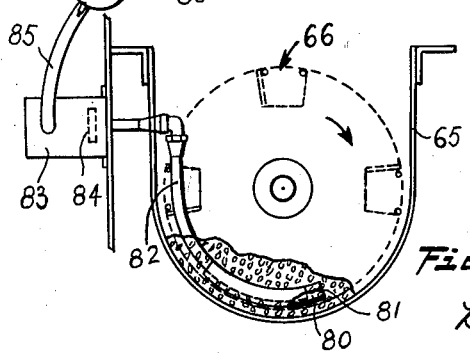
FIG. 10 is a fragmentary sectional view taken along the line 10—10 in FIG. 7.
Figure 11:
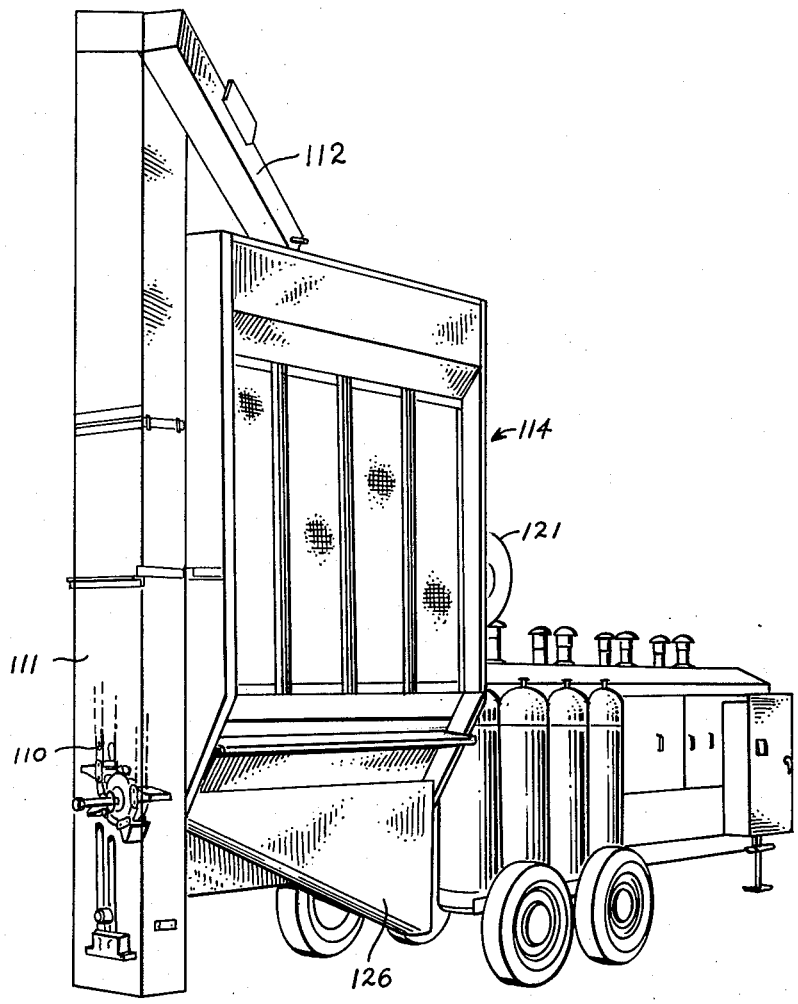
FIG. 11 is a perspective view showing a modified form of cooling mechanism mounted on the apparatus.

As shown in FIG. 10, U-shaped sheet panels 65 provide supports for the grain and the grain is moved longitudinally and tumbled in the housing 65 by a screw conveyor 66. As shown in FIG. 7, the screw conveyor 66 comprises hubs 67 rotatably mounted in each end of the frame 60 (one only being shown). Shaft 68 on hubs 67 at one end of the dryer extend into position where they can be driven. Wire rods 69 extend between pairs of hubs 67. A spiral 70 is formed by arcuate or annular pieces of metal joined successively and is welded to rods 69 to form the spiral which is open at its center. Tabs 71 are struck out from the periphery of spiral 70 and extend generally axially and the rods 69 are positioned in the struck out portions of the spiral and are welded thereto. In this fashion, the screw conveyor 66 is of such a construction that the grain is moved longitudinally and simultaneously tumbled. The use of the rods 69 eliminates the necessity for a solid shaft thereby preventing mashing or grinding of the grain as it is moved and tumbled.

As the grain leaves the end 23 of the conveyor, a transversely extending screw 75 moves the grain laterally to a conduit 76 that directs the grain to a cooling apparatus 77.

Moisture Control System

Prior to passage to the transverse conveyor 75, the moisture content of the grain is continuously checked by an apparatus presently described and the rate of rotation of the screw conveyors is adjusted in accordance with the moisture content thereby insuring that the grain is dried to a predetermined level.

The moisture control system comprises a device for continuously measuring the moisture content of the grain as it leaves the conveyor and for continuously adjusting the speed of the conveyor in response to the moisture content reading.

As shown in FIG. 10, an aspirator tube 80 which comprises a hollow arcuate member having perforations 81 in the bottom wall thereof communicates with a tube 82 extending to an air-tight casing 83 mounted externally of dryer housing 21. A humidity-sensing element 84 is positioned in casing 83. A tube 85 extends from the casing 83 to a source of vacuum such as a suction fan 86. The aspirator tube 80 is adapted to be submerged in the grain and the suction from the fan 86 causes air to be drawn continuously through the grain into the aspirator tube and through tube 82 and casing 83. The air is drawn through tube 80 at such a rate as to provide a temperature equilibrium between the grain and the air. The relative humidity of the air is thus directly related to the moisture content of the grain. Humidity sensing element 84 is of the type which has its resistance changed in accordance with the atmosphere in contact with it.

Figure 15:
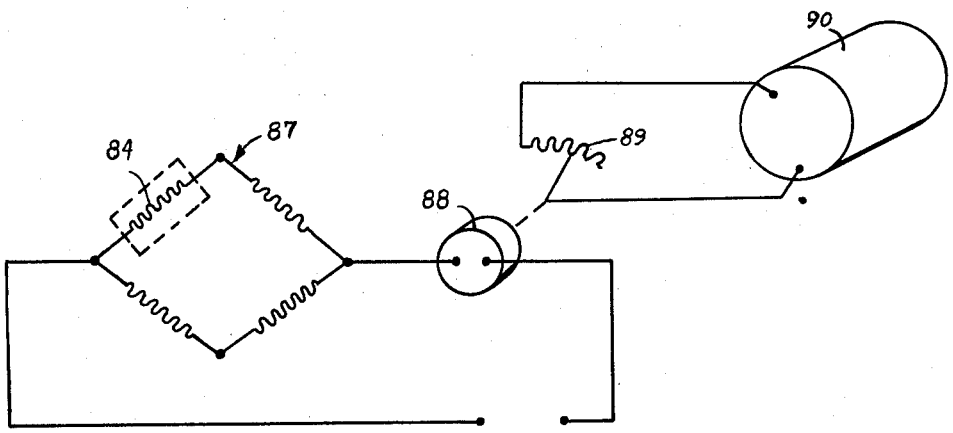
FIG. 15 is a diagrammatic wiring diagram of the moisture control apparatus used in the grain drying apparatus.

As shown in FIG. 15, the humidity-sensing element 84 forms a part of a Wheatstone bridge 87 so that when the resistance of the element 84 is changed, the Wheatstone bridge 87 is unbalanced producing a signal. The signal from the Wheatstone bridge 87 operates a small motor 88 which in turn operates a potentiometer 89 in one direction or another to control a variable drive motor 90 to the conveyors 66.

By this arrangement, the sensing of the moisture content of the grain is continuous, resulting in continuous control of the speed of the conveyor so that the grain is passed below the infrared gas generators at such a rate that a precise accurate control of the reduction in moisture content is achieved. By varying the adjustment of Wheatstone bridge 87 the balanced rate of movement of conveyors 66 for a predetermined moisture content is achieved.

Cooling Apparatus

After the grain is treated to remove the moisture, it is cooled so that it can be readily handled.

Figure 8:
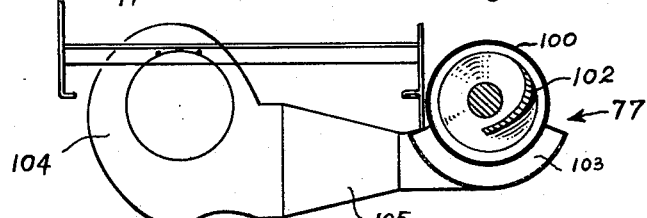
FIG. 8 is a fragmentary sectional view taken along the line 8—8 in FIG. 7.
Figure 9:
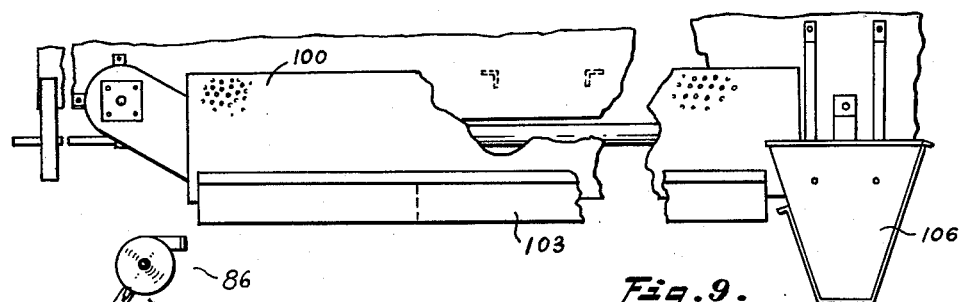
FIG. 9 is a fragmentary part sectional side elevation of the apparatus shown in FIG. 7.

As shown in FIGS. 7, 8 and 9, cooler 77 comprises a perforated drum 100, the perforations 101 of which are smaller than the grain size. A screw 102 is fastened to the interior of the drum and the screw 102 is mounted for rotation through a drive mechanism with the conveyor so that the screw 102 and drum 100 are rotated at a speed proportional to the speed of the conveyor 70.

An arcuate air chamber 103 is provided adjacent a portion of the periphery of the drum 100 and cooling air is supplied to the chamber 103 by a fan 104 connected to the chamber 103 by conduit 105. In this fashion, air is continuously supplied to the periphery of drum 100 passing through the grain to the opposite side of the drum thereby cooling the grain. The rotation of the screw 102 simultaneously with the drum 100 to which it is fixed moves the grain toward one end of the drum and discharges the grain into a hopper 106 from which it can be removed by a portable screw conveyor to a truck or other vehicle.

A modified form of cooling apparatus is shown in FIGS. 11–14 and is used with the dryer shown in FIGS. 1 and 2. This cooling apparatus comprises a bucket elevator 110 enclosed in a housing 111 which receives the grain from the screw conveyor 75 (FIG. 7) through an opening (not shown) in housing 111 and elevates it to a chute 112. The chute 112 directs the grain into a hopper 113 formed in the upper part of a cooling device 114. As shown in FIGS. 12 and 13, the cooling device comprises frames which support spaced pairs of vertical screens 115, 116 and 117, 118. The space between each pair of screens preferably diverges downwardly. The screens are supported between end walls 119, 120 so that a chamber 121a is provided between the pairs of screens. A blower 121 directs cooling air under pressure into the chamber 121a and forces the air outwardly through the screens. The grain after passing through the spaces between the pairs of screens is collected in a hopper 122 in the lower end of which is positioned a displacement device 123 that comprises a shaft 124 and radially extending blades 125. The device 123 is rotated in synchronism with the conveyor so that the grain is discharged from the cooling device 114 at a predetermined rate corresponding to the rate of movement of the grain through the dryer. A tapering chute 126 is positioned below the device 123 and discharges the grain in the direction of the arrow so that it can be loaded in a vehicle or the like.

The height of the grain between each pair of screens is maintained so that the entire area between each pair of screens is filled with grain at all times. In this fashion, the cooling air passes through the grain fully cooling the grain to a temperature at which it can be readily handled without damaging the grain.

Operation

In operation, the infrared gas generators 31 are ignited and thereby give off far infrared rays which are directed downwardly onto the conveyors 66. Grain is continuously introduced at the inlet 22 and is conveyed through the dryer by rotation of the conveyors 66, the grain being simultaneously tumbled as it is moved through the dryer. The far infrared rays passing downwardly from generators 31 onto the grain cause a uniform heating of the grain. The moisture that is given off is exhausted through the housing 42 and exhaust conduit 45. The formation of the conveyors 66 by the annular blades tied together by the tie rods 69 causes the proper movement of the grain and tumbling of the grain without grinding or mashing thereof.

Since the far infrared rays penetrate the grain and cause a uniform heating thereof throughout, no excessive burning or scorching of the grain occurs.

As the grain is discharged to the transverse conveyor 75, the humidity thereof is constantly checked by the humidity control mechanism, namely, the passage of air through the grain to the sensing element 84. The speed of the conveyors 66 is continuously varied in accordance with the humidity reading of the sensing element 84. If the humidity is higher than a predetermined amount, the conveyor speed is reduced and if the humidity is lower than the predetermined amount, the speed of the conveyor is increased to provide a proper balance in the drying of the grain.

After the grain has been dried, it is then cooled in a cooler such as cooler 77 or cooler 114.

The control of the drying in accordance with the relative humidity of air in equilibrium with the grain results in an accurate and speedy control of the moisture content of the grain within predetermined limits.

The use of far infrared rays for drying prevents any scorching and results in a uniform drying of the grain so that when the grain is cooled it will remain at the humidity to which it has been dried without absorbing humidity from the atmosphere. In this fashion, the moisture content of the grain will not fluctuate excessively in accordance with atmospheric conditions.

The provision of the housings and associated structure on the infrared gas generators permits the generators to be used in enclosed spaces without adversely affecting the burning of the gases therein and without causing a fire or explosion hazard. The control mechanism used in association with the infrared gas generators assemblies provides for a proper ratio of air to gas under all conditions. Finally, the control mechanism permits the safe shut off in case of failure of combustion.

The invention has been used in the drying of grain and particularly corn. It has been found that it is possible to control the moisture content of corn within one-half of one percent. The resultant corn is not only uniformly dried to a predetermined moisture content but this is accomplished without adversely affecting the germination or the composition such as the starch content, protein, carbohydrates, nitrogen and the like.

I claim:

1. An apparatus for drying grain which comprises conveyor means for moving said grain continuously in a mass of substantial thickness through a predetermined path, infrared gas generators positioned adjacent said path for directing predominantly far infrared rays on said grain, means beyond said gas generators for moving air continuously through said grain after it is passed beneath the generators and establishing a temperature equilibrium between said air and said grain, means for measuring the relative humidity of said air, and means responsive to said latter means for controlling the movement of said conveyor means.

2. An apparatus for drying grain comprising conveyor means for moving a mass of grain continuously through a predetermined path, infrared gas generators positioned adjacent said path for directing predominantly far infrared rays on said grain, a humidity sensing element, conduit means having one end thereof in communication with said humidity sensing element and the other end thereof submerged in said grain at a point in said path after said grain has passed adjacent said generator, means for inducing a flow of air through said grain and said conduit means toward said humidity sensing element and establishing a temperature equilibrium between said grain and said air, whereby said humidity sensing element measures the relative humidity of the air, and means responsive to the reading of said humidity sensing element for controlling the rate of movement of said conveyor means and thereby controlling the rate of heating of said grain.

3. An apparatus for drying grain which comprises means defining a tunnel, screw conveyor means positioned within said tunnel with the axis thereof extending longitudinally of said tunnel for moving and tumbling grain continuously in a predetermined path through said tunnel, infrared gas generators for generating heat rays which are predominantly in the far infrared positioned at longitudinally spaced points in said tunnel in overlying relationship to said screw conveyor for directing predominantly far infrared rays onto said grain, said screw conveyor comprising a plurality of longitudinally extending rods, annular sheet-like members connected to said rods and defining an annular spiral screw, the center of said screw being open axially thereof, and axially extending tabs struck out from said screw.

References Cited in the file of this patent

UNITED STATES PATENTS

| | | |
|---|---|---|
| 1,225,381 | Wedge | May 8, 1917 |
| 1,259,029 | Lucke | Mar. 12, 1918 |
| 2,186,032 | Mann | Jan. 9, 1940 |
| 2,220,928 | Kienle et al. | Nov. 12, 1940 |
| 2,428,090 | Naeher et al. | Sept. 30, 1947 |
| 2,509,543 | Truax | May 30, 1950 |
| 2,552,835 | Arnold | May 15, 1951 |
| 2,581,756 | Erisman | Jan. 8, 1952 |
| 2,677,195 | Menning | May 4, 1954 |
| 2,706,345 | Arndt | Apr. 19, 1955 |
| 2,732,630 | Markowich | Jan. 31, 1956 |
| 2,772,487 | Arndt | Dec. 4, 1956 |
| 2,840,922 | Erisman et al. | July 1, 1958 |
| 2,886,902 | Christian | May 19, 1959 |
| 2,935,009 | Cloud et al. | May 3, 1960 |
| 2,991,559 | Pierpoint | July 11, 1961 |

FOREIGN PATENTS

| | | |
|---|---|---|
| 68,686 | Sweden | Jan. 7, 1930 |